June 24, 1947. S. H. STOTTRUP 2,422,862
FOLDING UTILITY CART
Filed March 20, 1946 2 Sheets-Sheet 1
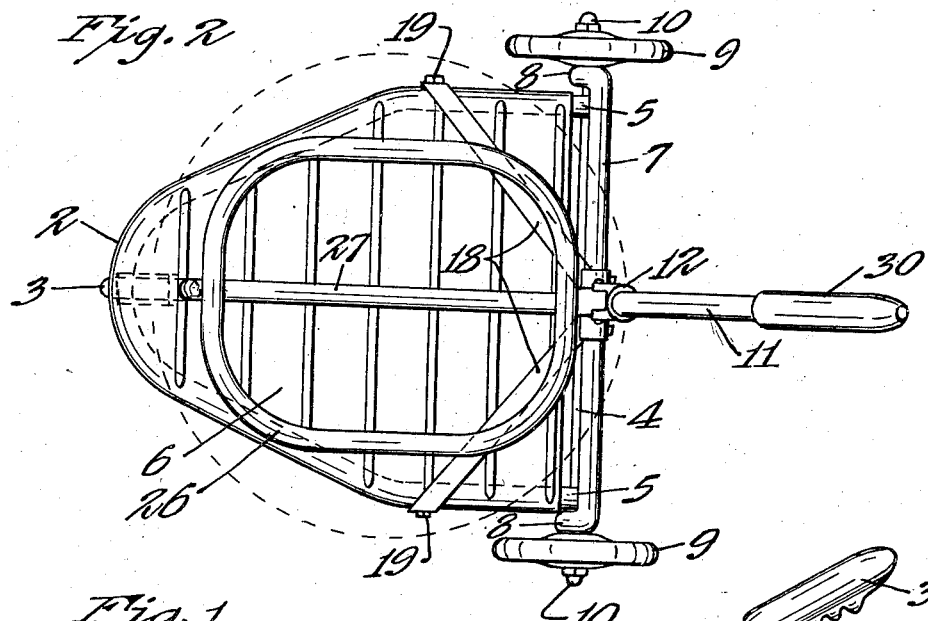
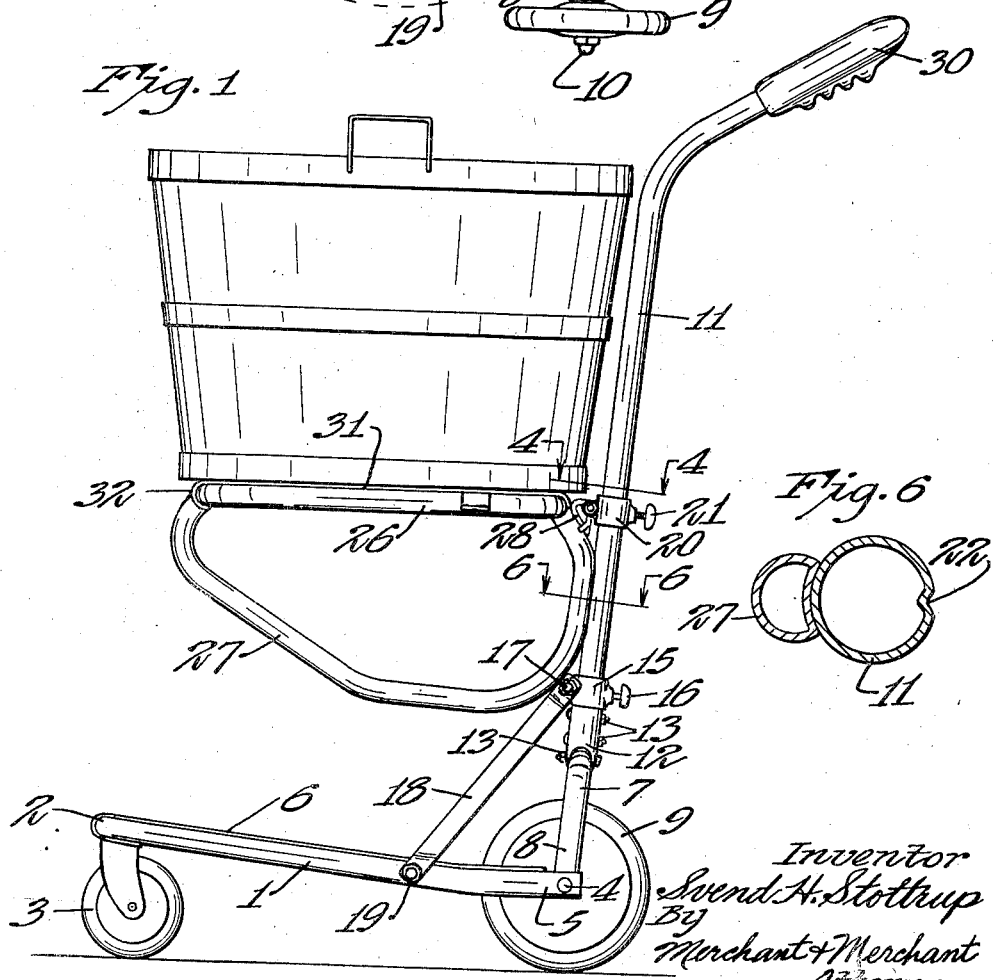

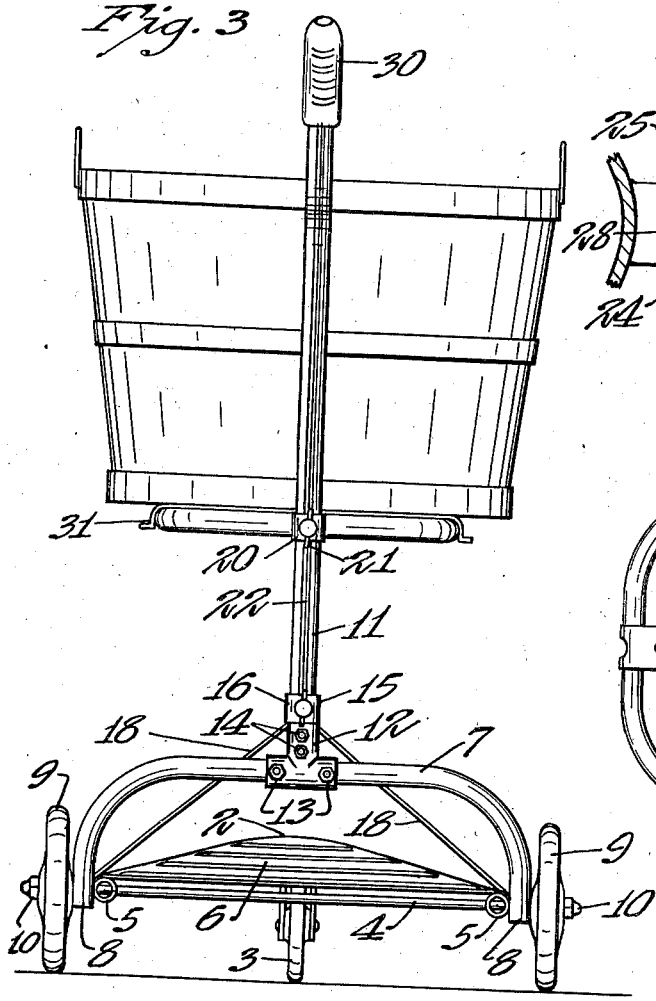

Patented June 24, 1947

2,422,862

UNITED STATES PATENT OFFICE 2,422,862

FOLDING UTILITY CART

Svend H. Stottrup, Waterloo, Iowa, assignor of one-third to Sigurd Stottrup and one-third to Helge Stottrup, both of Waterloo, Iowa Application March 20, 1946, Serial No. 655,670

8 Claims. (Cl. 280—36)

My invention relates to a general purpose transporting device which I have chosen to define as a "utility cart."

The primary object of my invention is a provision of such a device which can be utilized for a great number of uses, such for instance, as a baby stroller, a cart for conveying laundry baskets, shopping bags or other relatively light loads, or a device for transporting heavier loads, such as a sack or a bushel of potatoes and the like.

Another object of my invention is to provide a device which will carry relatively light loads, such as a clothes basket or shopping bag at a height which will not require the operator to lean over materially in order to deposit or remove the items being transported and can likewise be utilized to carry a heavier load at a level only slightly above the ground.

Another object of my invention is the provision of such a structure which can be readily folded or collapsed to facilitate transportation, shipping or storage of the same.

A still further object of my invention is the provision of such a device which is rigid in construction, inexpensive to manufacture and which is extremely durable.

The above and still further objects of my invention will become apparent from the following specification, attached drawings and appended claims.

Referring to the drawings wherein like characters indicate like parts throughout the several views:

Fig. 1 is a side elevation of my novel structure with near rear wheel removed illustrating its use in the transporting of a clothes basket or other relatively light loads;

Fig. 2 is a top plan view of the structure shown in Fig. 1, some parts being shown by dotted lines;

Fig. 3 is a back view in elevation;

Fig. 4 is a fragmentary sectional view taken on the line 4—4 of Fig. 1;

Fig. 5 is a top plan view of the upper frame member;

Fig. 6 is a fragmentary sectional view taken on the line 6—6 of Fig. 1;

Fig. 7 is a side elevation with the upper frame member in dotted lines and equipped with a baby stroller adapter; and Fig. 8 is a front elevational view of the above.

Referring with greater particularity to the drawings, the numeral 1 indicates a generally U-shaped or V-shaped bottom frame member and which is normally in a horizontally disposed position, as indicated in Fig. 1. U-shaped lower frame member 1 is inverted so that the closed end 2 thereof projects forward and has secured thereto a preferably rubber tired caster wheel 3. An axle 4 extends loosely through the opposite spaced ends 5 of lower frame 1. Frame 1, as shown, is preferably made from tubular stock and is provided with a platform or spanner sheet 6, preferably and as shown being corrugated so as to impart a greater rigidity thereto.

An inverted U-shaped member or yoke 7 is shown as having its opposite lower ends 8 pivoted to axle 4 at points immediately adjacent but laterally outwardly of the spaced ends 5 of lower frame member 1. The extreme outer ends of axle 4 are provided with wheels 9, also preferably and as shown, being equipped with rubber or other suitable tires, and held securely in place by burrs or the like 10.

A preferably tubular handle 11 is secured to the intermediate portion of yoke 7 by means of a T-shaped split bracket 12. As shown, nut-equipped bolts 13 secure bracket 12 to yoke 7 while nut-equipped bolts 14 secure bracket 12 to the lower end of handle 11. A collar 15 is slidably mounted on the lower end of handle 11 for vertical adjustments. The collar 15 is provided, as shown particularly in Fig. 1, with a thumb nut 16, which enables the operator to lock collar 15 in any desired position on handle 11. Pivoted to the front portion of collar 15, as indicated at 17, are a pair of metal links 18, which links have the lower ends pivoted at 19 to the opposite side edges of lower frame member 1 at points forward of axle 4.

It should be apparent that the pivotal connection of handle 11 to axle 4 through yoke 7, the pivotal connection of the rear ends 5 of lower frame member 1 to axle 4, and the pivoted connections of links 18 with the lower frame member 1 and collar 15 make it possible not only to adjust the angular position of the handle 11 with respect to lower frame 1 but also to fold the lower frame member 1 flat against the handle 11 for purposes of shipping or storing the same.

Positioned above sliding collar 15 is a second sliding collar 20, also vertically adjustable on handle 11. Collar 20 is equipped with a thumb screw 21, the inner end of which comes to bear upon handle 11 in an elongated axially extending groove 22 as particularly illustrated in Fig. 6. The obvious purpose of having the inner end of thumb screw 21 ride in slot 22 is to prevent lateral turning movements of the collar 20. Formed integrally with collar 20 and projecting forwardly thereof is a bifurcated jaw or bracket member 23 having spaced parallel jaws 24 and 25. An upper frame member is shown as being in the form of an endless tubular ring 26. Upper frame member 26 has a centrally located vertically disposed, depending reinforcing member 27 joining its forward and rearward ends. As shown particularly in Figs. 1 and 4, upper frame member 26 is provided with a rearwardly extending tongue 28 which extends loosely between jaws 24 and 25 and is pivoted therebetween by means of a nut-equipped bolt 29. This loose pivot provided by members 24, 25, 28 and 29 provides a natural lock for holding member 26 in its collapsed position along tubular handle 11. It will be observed that as member 26 is folded upward to the point where it comes into contact with tubular handle 11, the weight thereof forces member 28 downward upon the bolt 29, in which new position the forward or falling movement of member 26 is checked, at least until such a time as member 26 is manually lifted to a position where bolt 29 and member 28 are in the approximate position in Fig. 1.

As shown particularly in Figs. 1 and 6, the rear portion of reinforcing member 27 abuts against the intermediate portion of handle 11 so as to check the downward pivotal movement of upper frame member 26. It will be observed that the extreme rear surface of reinforcing member 27, which member 27 is also shown as being briefly tubular, is bent or formed inwardly in a convex shape so as to correspond approximately to the arcuate surface of handle 11 against which it rests when in a load-carrying position. This nesting of the reinforcing member 27 against the handle 11 also greatly checks any tendency of the collar 20 and upper frame member 26 against lateral turning movements.

The extreme upper end of handle portion 11 is provided with a handle grip 30 which is preferably removable so as to make possible the removal from the handle portion 11 of sliding collar 20 and upper frame member 26. It is obvious that such an occasion may arise when objects of considerable weight and height are being carried directly on the platform 6 of lower frame member 1.

In Figs. 1, 2, 3 and 5, I show an ordinary clothes basket mounted on top of the ring-like upper frame member 26. Under such circumstances it may or may not be necessary to provide the ring-like upper frame member 26 with a cross member 31 having downturned ends 32 which prevent lateral shifting thereof. In Figs. 7 and 8, I have shown in dotted lines the upper ring-like frame member 26 as being equipped with a baby stroller adaptor which comprises a ring-like frame 33 of a shape and diameter which will rest upon ring-like upper frame member 26, and an approximately semi-circular hammock 34, which has a maximum diameter only slightly less than the diameter of the ring-like upper frame member 26 and therefore centers itself within said member 26.

While I have shown a commercial form of my device as required by Sec. 4488 of the U. S. Statutes, it should be obvious that my invention is capable of modification and without departure from the scope of the appended claims.

What I claim is:

1. In a device of the class described, a horizontally disposed lower frame, wheels mounting said frame, an upwardly and rearwardly extending handle pivotally associated with the rear end of said frame, an adjustable collar vertically slidable on said handle, a horizontally disposed upper frame connected to said collar by a horizontal pivot, a depending portion of said upper frame member engaging said handle immediately below said collar and limiting the downward pivotal movements of said frame.

2. The structure defined in claim 1 in which said lower frame member is U-shaped and has a caster on the front end and a wheel connected to its opposite rearwardly projecting ends.

3. The structure defined in claim 1 in which said upper frame is in the nature of an endless ring.

4. The structure defined in claim 3 in further combination with a second vertically adjustable collar slidably mounted on said handle and a pair of links pivoted at their upper ends to said last-mentioned collar and at their lower ends to the opposite side edges of said lower frame member.

5. The structure defined in claim 1 in further combination with an elongated axially extending groove in said handle and a thumb screw carried by said collar, the inner end of said thumb screw being adapted to ride in said groove and prevent lateral turning movements of the collar and upper frame carried thereby.

6. In a device of the class described, a U-shaped lower frame member having a caster connected thereto intermediate its rearwardly projecting ends, an axle passing loosely through the opposite rearwardly projecting ends of said frame and mounting said frame for up and down pivotal movements, a wheel on the opposite ends of said axle, an upwardly and rearwardly extending handle member pivotally connected to said axle, means for limiting the pivotal movements of said handle on said axle, a vertically adjustable collar slidably mounted on said handle, a normally horizontally disposed upper frame connected to said collar by a horizontal pivot, a depending rear portion of said upper frame being so positioned as to engage the handle portion and check the downward pivotal movement of said upper frame member.

7. In a device of the class described, a horizontally disposed U-shaped lower frame member having a caster connected thereto intermediate its rearwardly projecting ends, an axle passing loosely through the opposite rearwardly projecting ends of said lower frame and mounting the front end of said frame for up and down pivotal movements, a wheel on the opposite ends of said axle, a spanner sheet spanning the space between the opposite sides of said lower frame member, a yoke having its opposite ends pivoted to said axle intermediate the opposite sides of said frame and the wheels, an upwardly and rearwardly extending handle rigidly connected to the intermediate portion of said yoke, a vertically adjustable collar slidably mounted on said handle, a pair of links pivoted at their upper ends to said collar and at their lower ends to the opposite side edges of said lower frame member at points in advance of said axle, an elongated axially extending groove in the intermediate portion of said handle, a second vertically adjustable collar slidably mounted on said handle above said first-mentioned collar, a thumb nut carried by said last-mentioned collar with the inner end thereof adapted to ride in said groove in the handle, and an upper frame connected to said last-mentioned collar, by a horizontal pivot, a depending rear portion of said upper frame being so positioned as to engage the handle portion and check said upper frame member against excessive downward movement.

8. The structure defined in claim 7 in which said handle portion is approximately circular in cross section and the depending rear portion of the upper frame member which engages the handle portion is made concave so as to conform to the shape of said handle.

SVEND H. STOTTRUP.